United States Patent
Koizumi et al.

[19]

[11] Patent Number: 5,936,802
[45] Date of Patent: Aug. 10, 1999

[54] WIRING STRUCTURE IN THE LOAD BEAM AND GUIDE ARM OF A MAGNETIC DISK DRIVE

[75] Inventors: Yuichi Koizumi, Kanagawa-ken; Toshihisa Okazaki, Odawara, both of Japan

[73] Assignee: Hitachi, Ltd., Tokyo, Japan

[21] Appl. No.: 08/753,764

[22] Filed: Nov. 29, 1996

[30] Foreign Application Priority Data

Dec. 1, 1995  [JP]  Japan ..................................... 7-314320

[51] Int. Cl.⁶ ....................................................... G11B 5/48
[52] U.S. Cl. .............................................................. 360/104
[58] Field of Search ..................................... 360/103–105

[56] References Cited

U.S. PATENT DOCUMENTS

| | | | |
|---|---|---|---|
| 4,759,119 | 7/1988 | Noguchi et al. | 360/104 |
| 5,491,597 | 2/1996 | Bennin et al. | 360/104 |
| 5,528,819 | 6/1996 | McKay et al. | 360/104 |
| 5,585,979 | 12/1996 | Erpelding et al. | 360/104 |
| 5,594,607 | 1/1997 | Erpelding et al. | 360/104 |
| 5,597,496 | 1/1997 | Masaichi et al. | 360/104 |
| 5,598,307 | 1/1997 | Bennin | 360/104 |
| 5,606,477 | 2/1997 | Erpelding et al. | 360/104 |
| 5,608,591 | 3/1997 | Klaassen | 360/104 |
| 5,610,785 | 3/1997 | Aoyagi et al. | 360/104 |
| 5,612,840 | 3/1997 | Hiraoka et al. | 360/104 |
| 5,631,786 | 5/1997 | Erpelding | 360/97.01 |
| 5,680,274 | 10/1997 | Palmer | 360/104 |
| 5,699,212 | 12/1997 | Erpelding et al. | 360/104 |
| 5,737,152 | 4/1998 | Balakrishnan | 360/104 |
| 5,754,368 | 5/1998 | Shiraishi et al. | 360/104 |

FOREIGN PATENT DOCUMENTS 2-31389  2/1990  Japan ..................................... 360/104

*Primary Examiner*—Allen T. Cao
*Attorney, Agent, or Firm*—Antonelli, Terry, Stout & Kraus, LLP

[57] ABSTRACT

The actuator section comprises a magnetic head slider, a load beam of spring property for supporting the magnetic head slider, a guide arm and a fastening member for fastening the load beam to the guide arm. On the surface of the load beam, a flexible wiring pattern is jointed. The wiring pattern passes nearly through a center of the load beam and through a broad portion beside the fastening member. An extension wiring pattern is obtained by extending the wiring pattern from the broad portion to a circuit board attached to the actuator. At least on one side of the guide arm, a convex cross-sectional portion is so provided that opposite splice of generally flush to load beam mounting surfaces of the guide. To the respective of the splice planes, extension wiring patterns are jointed.

19 Claims, 8 Drawing Sheets

WIRING STRUCTURE IN THE LOAD BEAM AND GUIDE ARM OF A MAGNETIC DISK DRIVE

FIELD OF THE INVENTION

The present invention relates to a load beam for supporting a magnetic head and a guide arm for supporting the load beam of a magnetic disk drive, and in particular to an integrated wiring structure in which a wiring pattern from the magnetic head, the load beam and the guide arm are integrated.

BACKGROUND OF THE INVENTION

As techniques related to the above-mentioned integrated structure in a magnetic disk drive, known are a damping type magnetic head suspension assembly in Japanese Patent Application Laid-Open No. 1-162212, a gimbals wiring assembly for a magnetic head and manufacturing method thereof in Japanese Patent Application Laid-Open No. 5-36048, a supporting device for a slider in Japanese Patent Application Laid-Open No. 62-89286 and a magnetic head supporting mechanism in Japanese Patent Application Laid-Open No. 6-215513.

As compared with a conventionally used structure in which fine leads are wired on a load beam, the above-mentioned integrated structures have a small occupancy of a signal line and is advantageous for the recording and reproduction of a information signal using a high-frequency signal. In addition, the wiring pattern on the integrated structure is higher in rigidity than fine leads, so that the deformation of a load beam can be suppressed and the posture of a magnetic head (slider) can be maintained stably.

However, the above four publications refer to the wiring pattern structure on a load beam in detail, but not to the wiring pattern structure on a guide arm at all.

Especially, in the prior arts disclosed in the former two publications, the wiring pattern on a load beam is extended from a portion of the load beam, which affects a spring property of the load beam and then the wiring structure of the wiring pattern on a guide arm may greatly affect the deformation of the load beam and the accompanying posture stability of the magnetic head slider. This is because a weight of a wiring pattern bent near the load beam deforms the load beam when the wiring pattern extended from the load beam is bent at a nearly right angle near the load beam and jointed to a side surface of the guide arm.

On the other hand, in the prior arts disclosed in the latter two publications, a terminal of a wiring pattern is provided at an end of a load beam and a secondary wiring extends from such terminal. Since the terminal of the wiring pattern is disposed to face a magnetic disk, the secondary wiring is inherently disposed to face the magnetic disk. With an increase in the capacity of a magnetic disk drive, it is required to make a space between the stacked magnetic disks narrower for the promotion of a disk stacking or mounting density. The wiring in the latter two publications hinders the space between the magnetic disks from being narrowed.

Thus, in conjunction with a wiring-pattern integrated load beam, the wiring structure of a wiring-pattern integrated guide arm is an important technique to substantially affect the posture stability of a magnetic head slider and the disk mounting density of a magnetic disk drive.

SUMMARY OF THE INVENTION

The present invention is summarized in the following structures.

(1) A convex portion, more accurately a convex cross-sectional portion, or a notch or offset is provided on a side surface so that a splice portion generally parallel to the mounting surface of the load beam can be obtained and a wiring pattern extended from the load beam (extension wiring pattern) is jointed to and placed on the splice portion. Here, the "jointing" includes adhesion and plating.

(2) A wiring pattern is placed and jointed to the splice portion upto a portion of the splice portion which is not affect a deformation of the load beam, and the wiring pattern is extended from this portion to outside the load beam.

(3) The load beam is broadened at a portion thereof near the guide arm mounting portion for preventing the load beam from being deformed. A wiring pattern passes through the broad portion and extends from an end of the broad portion.

By the adoption of such a configuration, the following functions can be achieved.

(1b) The wiring pattern extended from the load beam is neither bent nor twisted, thereby never deforming the load beam.

(2b) Since the wiring pattern is extended from the end of the load beam which does not affect a deformation of the load beam, the wiring pattern does not deform the load beam even if the wiring pattern is bent or twisted.

(3b) Since the wiring pattern is extended from the broad portion of the load beam, the wiring pattern does not deform the load beam even if the wiring pattern is bent or twisted.

DESCRIPTION OF THE PREFERRED EMBODIMENTS

Figure 10A:
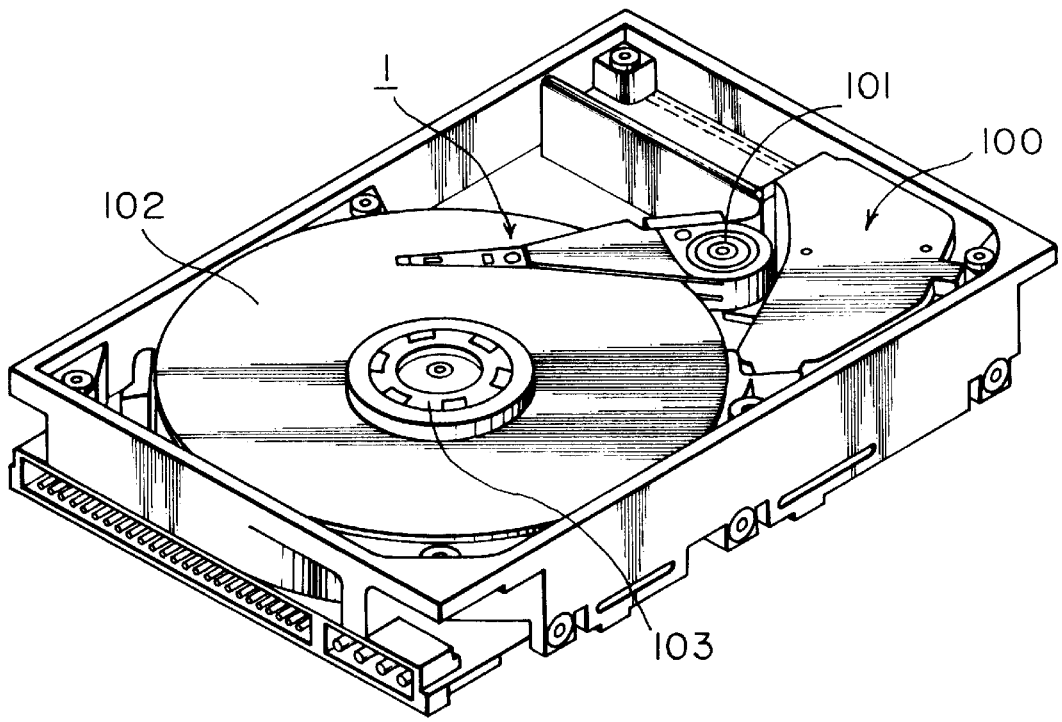
FIGS. 10A and 10B show a magnetic disk drive to which an actuator of the invention is applied.
Figure 10B:
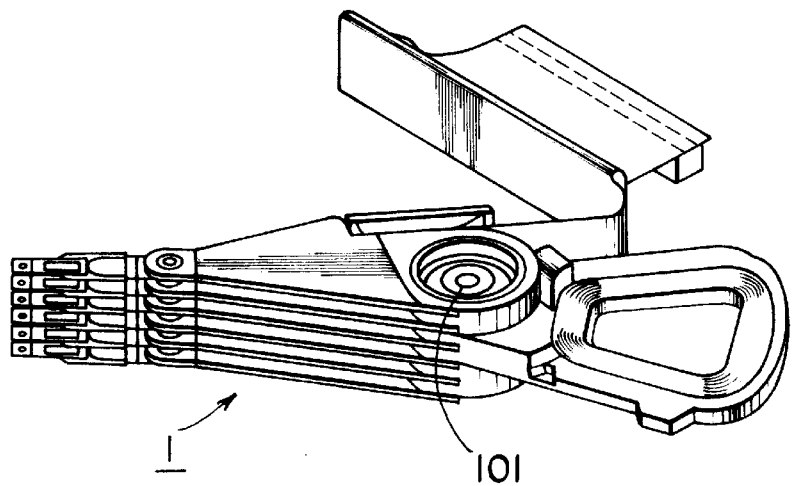

As shown in FIGS. 10A and 10B, a magnetic disk drive includes an actuator 1, a motor 100 for driving a shaft 101 of the actuator 1, and magnetic disks 102 fixed to a rotational shaft 103. The magnetic disks 102 are adapted to rotate with the rotational shaft 103. The actuator 1 is driven by the motor 100 so as to swing about the shaft 101 and skim the magnetic disks 102.

Figure 1:
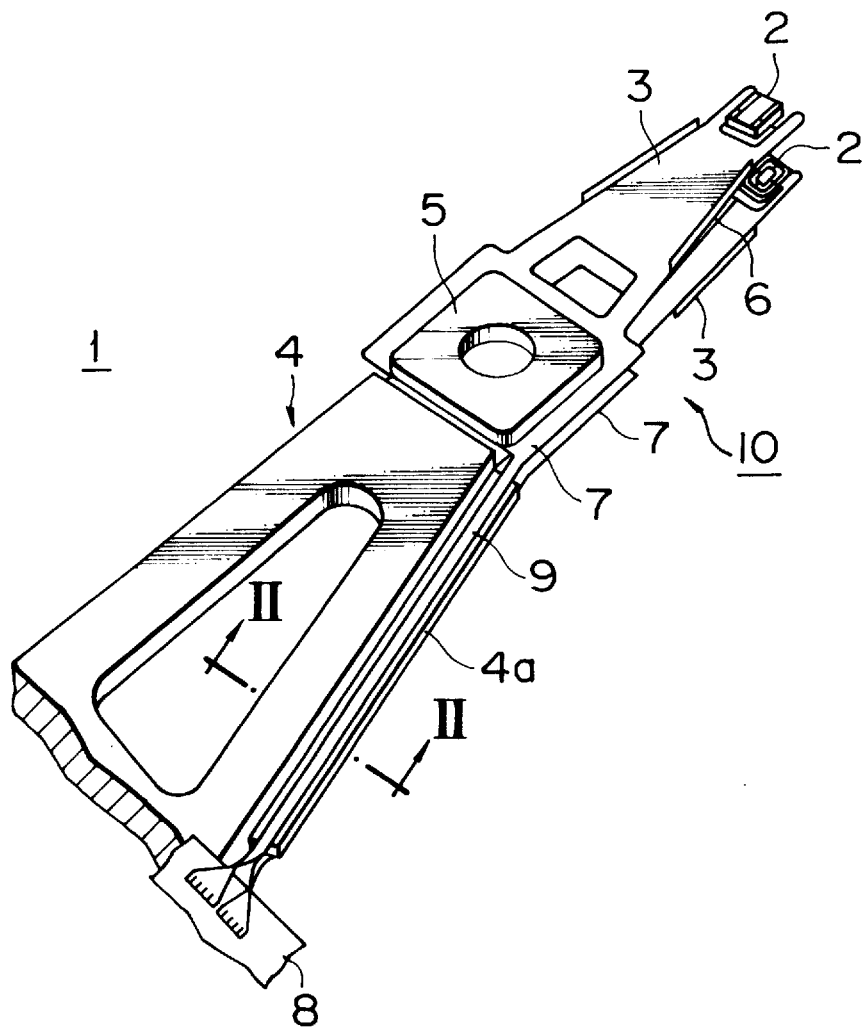
FIG. 1 is a fragmental perspective view of an actuator according to a first embodiment of the present invention.

In FIG. 1, the actuator 1 comprises a guide arm 4 and a magnetic head 10. The magnetic head assembly 10 comprises a magnetic head slider 2, a load beam 3 having a spring property and supporting the slider 2, and a fastening member 5 for fastening the load beam 3 to the guide arm 4. A flexible wiring pattern 6 is jointed to a surface of the load beam by means of adhesion or plating, for example.

The wiring pattern 6 has a terminal near the magnetic slider 2, which is electrically connected to a terminal of the magnetic slider 2. The wiring pattern 6 passes nearly through a center of the load beam 3 and through a broad portion 7 of the load beam 3 beside the fastening member 5.

An extension wiring pattern 9 extended from the wiring pattern 6 connects the wiring pattern 6 at the broad portion 7 to a circuit board 8 mounted on the actuator 1. To maintain the strength or to reduce the electric stray capacity, the extension wiring pattern 9 may include an extending member of the load beam 3 in which a part of the load beam 3 is extended and jointed to the wiring pattern while keeping the continuity to the broad portion 7.

One side face of the guide arm 4 has a convex portion 4a so that planes 4b of opposite sides of the portion 4a (FIG. 2) are substantially flush with mounting surfaces of the guide arm 4 by which the guide arm 4 is mounted to the load beam 3. The extension wiring pattern 9 is jointed to the plane 4b by means of adhesion or plating, for example.

Figure 2:
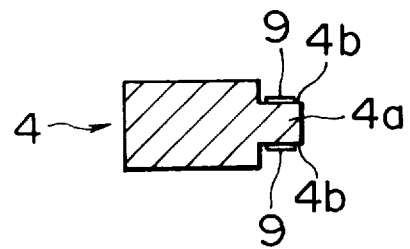
FIG. 2 is a sectional view taken along the lines II—II of FIG. 1.
Figure 3A:
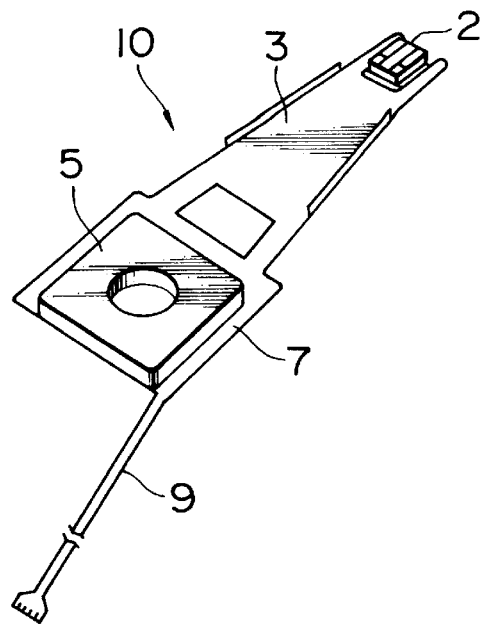
FIG. 3A is a perspective view showing a magnetic head assembly.
Figure 3B:
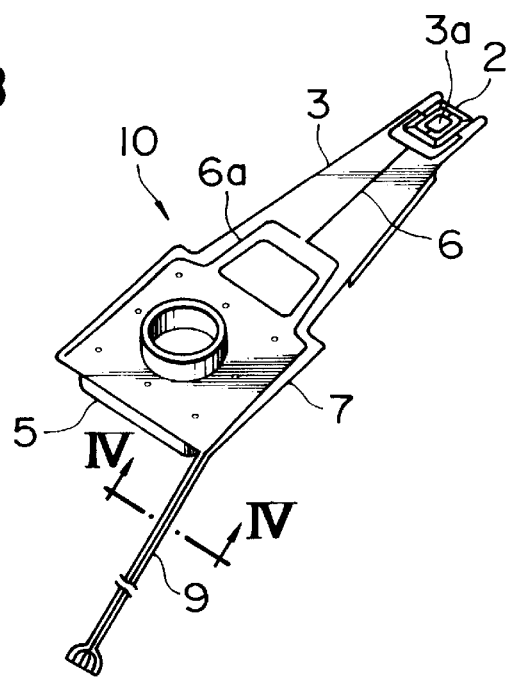
FIG. 3B is a perspective view of the assembly of FIG. 3A without a top thereof.
Figure 4:
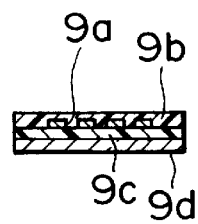
FIG. 4 is a sectional view taken along the lines IV—IV of FIG. 3B.

FIGS. 3A, 3B and 4 show the magnetic head assembly 10 shown in FIGS. 1 and 2. The magnetic head slider 2 is joined to a gimbals 3a (FIG. 3B) integrated with the load beam 3. A dummy pattern 6a disposed symmetrical to the wiring pattern 6 on the load beam 3 (FIG. 3B) is provided to prevent the deformation of the load beam due to thermal expansion and swelling of the wiring pattern 6. As shown in FIG. 4, the extension wiring pattern 9 comprises a stacked structure on the load beam member 9d made of stainless plate (thickness: t=0.5 mm–0.7 mm). In the stacked structure, a conductor layer 9a is interposed between insulator layers 9b and 9c (resin or silicon oxide film). The wiring pattern 6 and the dummy pattern 6a may be formed in advance on a blank stainless sheet which is to be worked into the load beam 3.

Figure 5A:
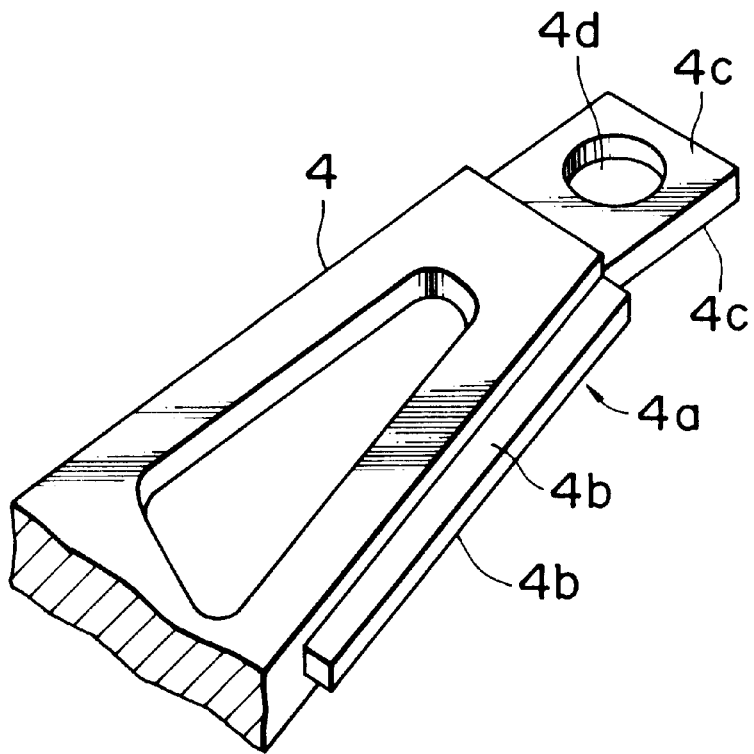
FIG. 5A is a perspective view showing a guide arm.

FIG. 5A shows the guide arm 4 in the embodiment of FIG. 1 and FIG. 2. In a tip of the guide arm 4, a fastening hole 4d for the fastening member 5 and mounting surfaces 4c (opposite sides) for the load beam 3 are provided. On one side of the guide arm 4, a convex (i.e., shelf) portion 4a is so provided that planes 4b (opposite sides) are substantially flush with the mounting surfaces 4c.

Figure 5B:
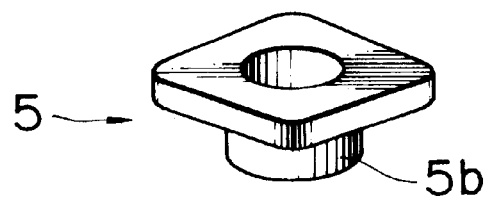
FIG. 5B is a perspective view showing a fastening member.

The fastening member 5 (FIG. 5B) is made of a material with a greater rigidity than that of the load beam 3, and is provided with a boss portion 5b to be inserted through the fastening hole 4d of the guide arm 4. The fastening member 5 with the boss portion 5b is integrated with one of the load beams 3 by spot welding (FIG. 3B).

Furthermore, after the boss portion 5b of the fastening member 5 of the above-mentioned integrated structure is inserted into the fastening hole 4d of the guide arm 4, the load beam 3 (FIG. 3A) is fastened to the mounting surface 4c of the guide arm 4 by swagging the boss portion 5b.

The broad portion 7 of the load beam 3 beside the fastening member 5 is so formed as to be broader than the mounting surface 4c of the guide arm 4 (FIG. 3A). The wiring pattern 6 passes from a terminal near the slider 2 (FIG. 3B) is jointed to the broad portion 7 of the load beam 3 through the center of the load beam 3 (FIG. 3b) and the vicinity of the fastening surface 4c of the guide arm 4 beside the fastening member 5. The wiring pattern 6 is further extended and continues with the extension wiring pattern 9.

The extension wiring pattern 9 is extended to be substantially flush with the load beam mounting face 4c, so that neither bending nor twist occurs in the wiring pattern 9 (FIG. 3B). Consequently, any deformation of the load beam 3 hardly occurs.

Since the bending or twist caused by a slight degree of offset is absorbed by the broad portion 7 (integrated with a greatly rigid fastening member) of the load arm 3, no deformation occurs in the load beam 3 for supporting the slider 2. Even if a wiring pattern 9 is twisted near the circuit board 8 (FIG. 1), this twist does not lead to the deformation of the load beam 3 since a greater part of the wiring pattern 9 is jointed to the plane 4b (FIG. 5A) of the guide arm 4 with an adhesive or an agglutinant.

In FIG. 3B, the wiring pattern 6 passes from the gimbals 3a at one end of the load beam 3 through the broad portion 7 and becomes an extension wiring pattern 9 extending from the other end of the load beam 3. The extension wiring pattern is not limited to this, but may extend from a portion beyond a range 3b (FIG. 9A) affecting the spring load, namely a portion within which the load beam 3 is fastened with the fastening member. According this, the load beam 3 is not deformed.

Figure 9A:
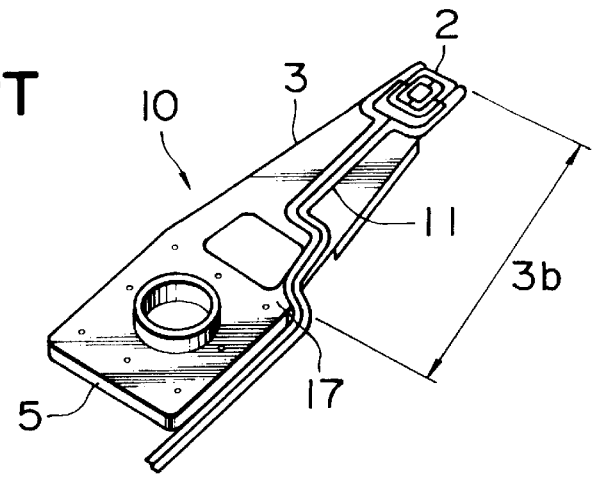
FIG. 9A is a top view of a conventional magnetic head assembly without a top thereof.
Figure 9B:
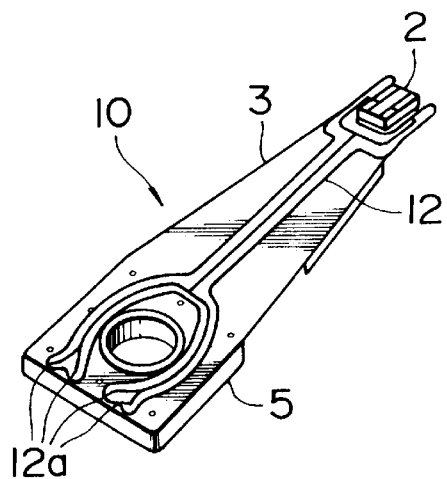
FIG. 9B is a top view of another conventional magnetic head assembly without a top thereof.
Figure 9C:
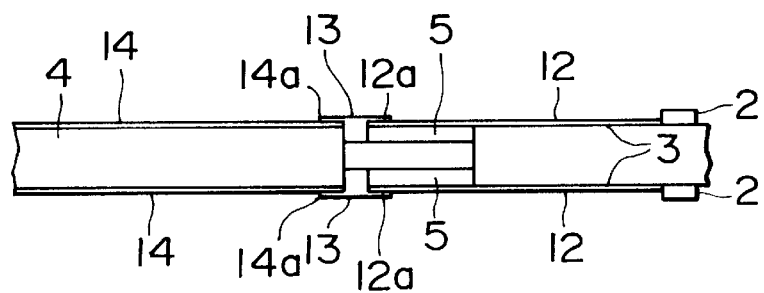
FIG. 9C is a side view of the magnetic head assembly of FIG. 9B, attached to a guide arm with a secondary wiring jointed thereto.

FIGS. 9A to 9C show magnetic head assemblies according to conventional techniques. FIG. 9a shows a magnetic head assembly disclosed in JP-A-5-36048.

The wiring pattern 11 is jointed to the load beam 3 after the formation thereof and is electrically connected at a terminal adjacent the magnetic head slider 2 to a terminal of the magnetic head slider 2. An extension wiring pattern is extended from outside the range 3b (FIG. 9A) affecting the spring load of the load beam 3.

Thus, if the extension wiring pattern is jointed to a side face of the guide arm, i.e., to a surface perpendicular to a main surface of the magnetic head assembly, the extension wiring pattern is bent at a right angle at a portion 17 of the load beam 3 near the fastening member (FIG. 9A) and then a reaction force is transmitted to the range 3b, thereby deforming the load beam 3. With this structure, a stable posture of the magnetic head slider cannot be obtained.

If a guide arm 4 having the planes 4b shown in FIG. 5A is applied even to such a structure of magnetic head assembly, neither bending nor twist occurs, so that no deformation occurs in the load beam 3. In this case, however, a considerable part of the extension wiring pattern becomes an aerial wiring and in consequence of being affected by a wind generated at the time of magnetic disk rotation, the aerial wiring part of aerial vibrates and then the vibration spreads from the load beam 3 to the magnetic head slider 2. It may make the posture of the magnetic head slider unstable.

Alternatively, FIG. 9B shows the magnetic head assembly disclosed in JP-A-6-215513. The wiring pattern 12 is jointed to the load beam 3 after the formation thereof and is electrically connected at one end thereof at a terminal adjacent the magnetic head slider 2 to a terminal of the magnetic head slider 2. At the other end of the wiring pattern 12, a terminal 12a for being connected to a secondary wiring 14 is provided (FIG. 9B).

The terminal 12a of the wiring pattern 12 and the terminal 14a of the secondary wiring 14 are electrically connected with each other through a joint line 13 (FIG. 9C).

Thus, in this prior art, the joint line 13 for electrically connecting the load beam 3 and the secondary wiring 14 is necessary and further the spacing between the magnetic disks must be determined with account taken of the movement of the joint line 13 in a direction perpendicular to an extension of the wiring pattern in addition to the thickness of the guide arm. If the present invention applied to the prior art, it is only necessary to take the thickness of the guide arm into consideration, so that this application is advantageous from the viewpoint of a high-density of disk stacking.

Figure 6A:
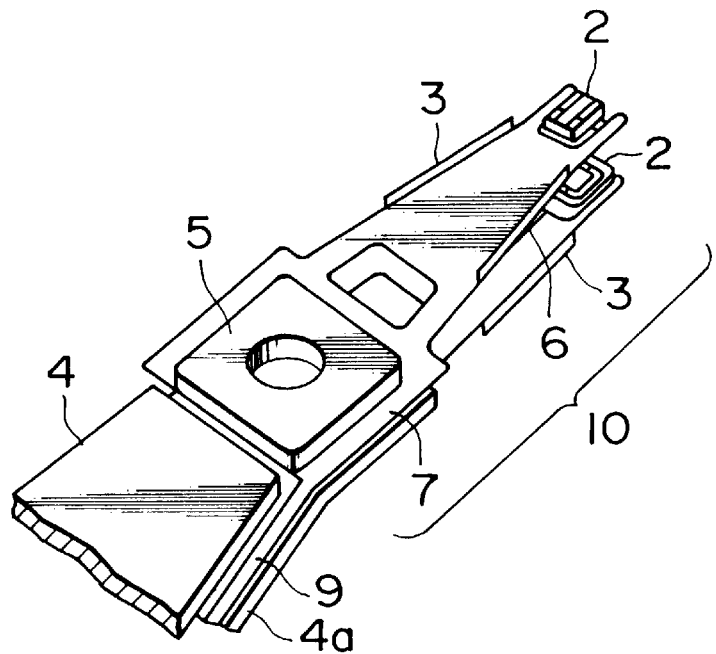
FIG. 6A is a fragmental perspective view showing an actuator according to second embodiment.
Figure 6B:
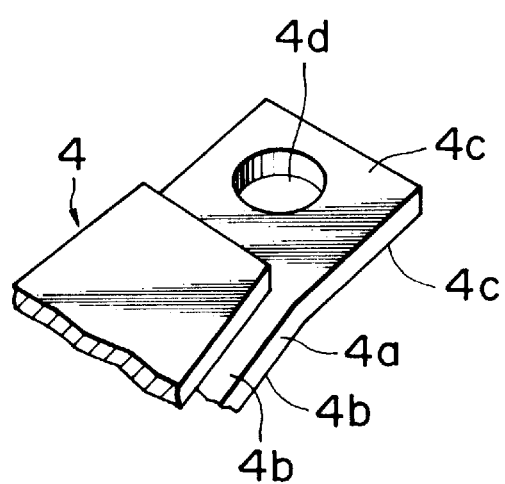
FIG. 6B is a top view showing the end of a guide arm 4 when the magnetic head assembly is removed from the actuator shown in FIG. 6A.

FIGS. 6A and 6B show the embodiment in which the mounting faces 4c of the load beam 3 and the mounting surfaces 4b of the extension wiring pattern 9 are continued, which has the following advantages:

(1) Since the mounting face 4c of the load beam and the extension wiring pattern mounting faces 4b of the load beam, both of them are continuous and then easily manufactured.
(2) Since there is no difference in level between these surfaces mentioned above, an even wiring structure can be made and thus the formation of an extension wiring pattern 9 is easy.
(3) Since the extension wiring pattern 9 is fixed by being jointed to the guide arm 4, the broad portion 7 of the load beam 3 does not vibrate due to a wind generated at the rotation of the magnetic disk. Consequently, the durability performance of the wiring pattern against the vibration is promoted.

Figure 7A:
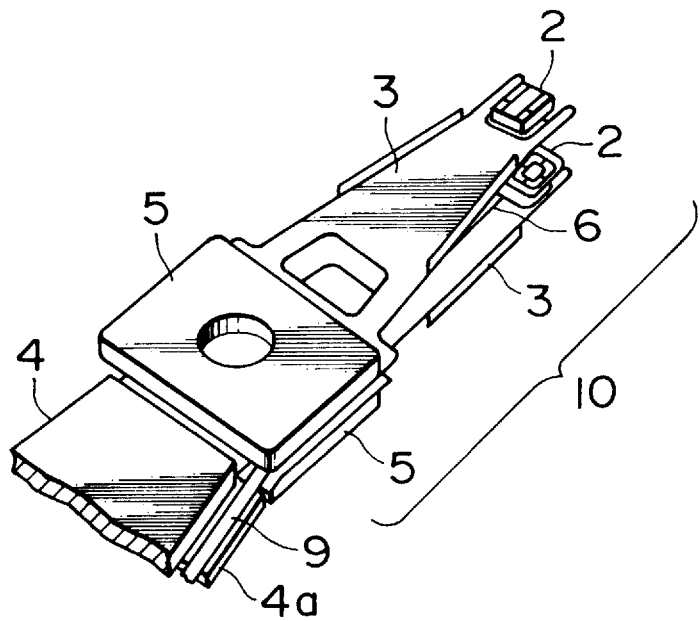
FIG. 7A is a fragmental perspective view showing an actuator according to third embodiment.
Figure 7B:
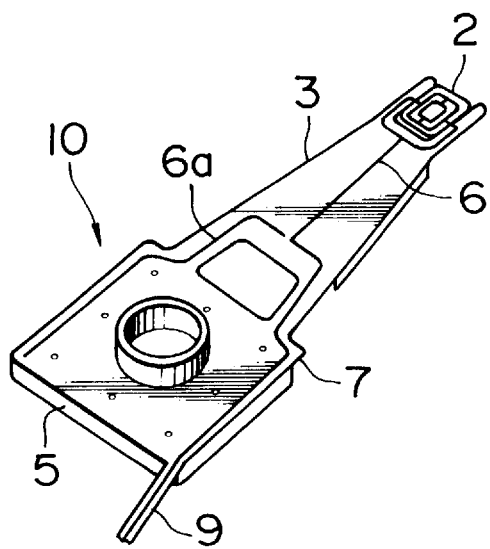
FIG. 7B is a top view of a magnetic head assembly in the actuator shown in FIG. 7A without a top thereof.

FIGS. 7A and 7B show a second embodiment in which the broad portion 7 of the load beam 3 is generally equal in width to the fastening member 5 and broader than the mounting face of the load beam 3.

In this case, there is an advantage similar to that of the structure shown in FIGS. 6A and 6B. Furthermore, since the fastening member 5 is equal in width to the broad portion, the wiring pattern 6 jointed to the broad portion 7 of the load beam 3 can be supported by the rigid fastening member 5, thereby reducing the influence of vibration during the rotation of the magnetic disk.

Figure 8A:
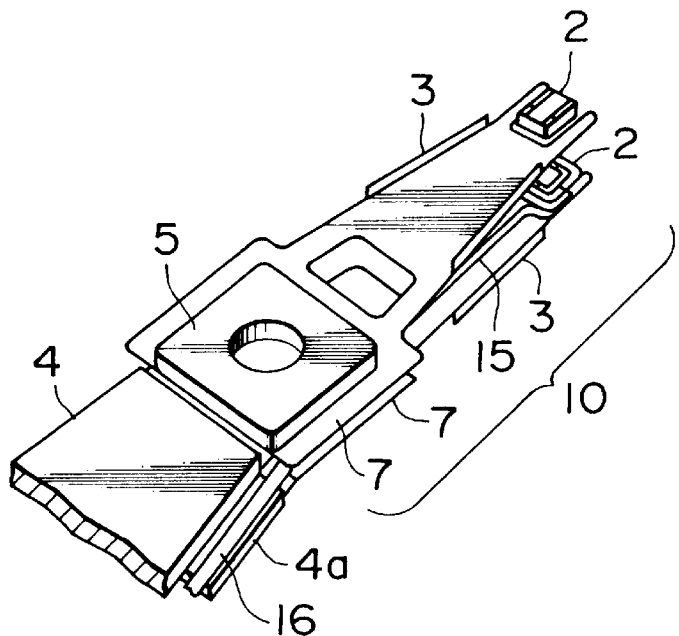
FIG. 8A is a fragmental perspective view of an actuator according to another embodiment.
Figure 8B:
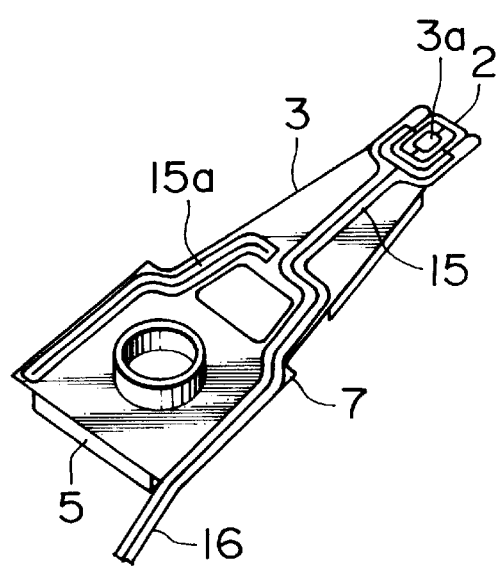
FIG. 8B is a top view of a magnetic head assembly in the actuator shown in FIG. 8A without a top thereof.

FIGS. 8A and 8B show an embodiment in which the wiring pattern 15 is jointed to the load beam 3 after the formation thereof. The wiring pattern 15 is jointed to the load beam 3 with an adhesive or an agglutinant. A dummy pattern 15a disposed at a symmetrical position to the wiring pattern 15 on the load beam 3 is provided to prevent the deformation of the load beam 3 due to thermal expansion and swelling of the wiring pattern 15. The other configurations are similar to those of FIGS. 1 to 4. However, the extension wiring pattern is denoted by 16.

Features described above of the present invention are summarized as follows;

1) A magnetic disk drive comprising: a rotational shaft rotatably supported; a magnetic disk medium fixed on the rotational shaft; a magnetic head slider disposed to face the magnetic disk medium for writing/reading information; a load beam for supporting at one end thereof the magnetic head slider; a guide arm supporting and fixing the other end of the load beam; a rotational shaft for supporting the guide arm so as to freely swing; and a voice coil motor for generating a rotational force on the guide arm supporting rotational shaft, wherein the load beam has a wiring pattern provided at a portion thereof adjacent the magnetic head slider with a terminal connected to a terminal of the magnetic head slider, the wiring pattern tracking on the load beam toward the guide arm, and being jointed on a portion of the load beam which portion does not affect a spring property of the load beam, the load beam further having an extension wiring pattern extended from the portion of the load beam toward the guide arm supporting rotational shaft, and the guide arm has a convex portion or an offset on at least one side of the guide arm to afford a splice portion generally parallel with a load beam mounting face of the guide arm, and the extension wiring pattern is jointed on such splice portion.

2) A magnetic disk drive according to the item 1), wherein, the guide arm has a convex portion on at least one side of the guide arm to afford opposite splice planes generally flush with opposite surfaces of a load beam mounting portion of the guide arm, and the extension wiring pattern is jointed to each of the opposite splice planes.

3) A magnetic disk drive according to the item 2), wherein, the guide arm has a convex portion on at least one side of the guide arm, opposite splice surfaces of which convex portion are continuous with surfaces of a load beam mounting portion of the guide arm, respectively, and the extension wiring pattern is jointed to the splice surfaces of the convex portion.

4) A magnetic disk drive comprising: a rotational shaft rotatably supported; a magnetic disk medium fixed on the rotational shaft; a magnetic head slider disposed to face the disk medium for writing/reading information; a load beam for supporting at one end thereof the magnetic head slider; a guide arm supporting and fixing the other end of the load beam; a rotational shaft for supporting the guide arm so as to freely swing; and a voice coil motor for generating a rotational force on the guide arm supporting rotational shaft, wherein the load beam is provided at one end thereof with a fastening member for fastening the load beam to the guide arm, and has a broad portion which is broader than the fastening member in its width direction, and the load beam further having a wiring pattern provided at a portion thereof adjacent the magnetic head slider with a terminal connected to a terminal of the magnetic head slider, the wiring pattern tracking on the load beam toward the guide arm, and being jointed on the broad portion of the load beam, and the load beam having an extension wiring pattern extended from an end of the broad portion toward the guide arm supporting rotational shaft, and the guide arm has a convex portion or an offset on at least one side of the guide arm to afford a splice portion generally parallel with a load beam mounting face of the guide arm, and the extension wiring pattern is jointed on such splice portion.

5) A magnetic disk drive comprising: a rotational shaft rotatably supported; a magnetic disk medium fixed on the rotational shaft; a magnetic head slider disposed to face the disk medium for writing/reading information; a load beam for supporting at one end thereof the magnetic head slider; a guide arm supporting and fixing the other end of the load beam; a rotational shaft for supporting the guide arm so as to freely swing; and a voice coil motor for generating a rotational force on the guide arm supporting rotational shaft, wherein the load beam is provided at one end thereof with a fastening member for fastening the load beam to the guide arm, and has a broad portion which is substantially equal to the fastening member in a width thereof and is broader than the load beam mounting portion of the guide arm in a width thereof, and the load beam further having a wiring pattern provided at a portion thereof adjacent the magnetic head slider with a terminal connected to a terminal of the magnetic head slider, the wiring pattern tracking on the load beam toward the guide arm, and being jointed on the broad portion of the load beam, and the load beam having an extension wiring pattern extended from an end of the broad portion toward the guide arm supporting rotational shaft, and the guide arm has a convex portion or an offset on at least one side of the guide arm to afford a splice portion generally parallel with a load beam mounting face of the guide arm, and the extension wiring pattern is jointed on such splice portion.

6) The magnetic disk drive according to any one of the items 1) to 5), wherein the extension wiring pattern is a wiring pattern jointed onto an extension of the load beam.

7) The magnetic disk drive according to one of the items 4) and 5), wherein a) the guide arm has a convex portion on at least one side of the guide arm to afford splice surfaces generally flush with opposite surfaces of a load beam mounting portion of the guide arm, and the extension wiring pattern is jointed on such splice surfaces; or b) the guide arm has a convex portion on at least one side of the guide arm, opposite surfaces of which convex portion are continuous with the respective of a load beam mounting portion of the guide arm, and the extension wiring pattern is jointed on such opposite surfaces.

According to the present invention, when a wiring pattern integrated load beam is applied to a magnetic disk drive, a wiring pattern integrated load beam which is applied by nature for the purpose of stably maintaining the posture of the magnetic disk drive can prevent the characteristics from being damaged due to a conventional easy and careless wiring structure in the guide arm and moreover can suppress the occurring of vibration in the aerial wiring portion.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A magnetic disk drive comprising:
   a rotational shaft rotatably supported;
   a magnetic disk medium fixed on said rotational shaft;
   a magnetic head slider facing to said magnetic disk medium and mounting a magnetic head for writing/reading information;
   a load beam for supporting at one end thereof said magnetic head slider;
   a guide arm for supporting and fixing the other end of said load beam;
   a second rotational shaft for supporting said guide arm so as to freely swing;
   a voice coil motor for generating a rotational force on said guide arm; and
   a substantially flat wiring pattern, electrically connected to said magnetic head near said magnetic head slider, and which tracks on a major planar surface of said load beam toward said guide arm and includes an extension wiring pattern;
      wherein said guide arm includes a wiring mounting surface that is offset in a thickness direction of said guide arm and provided on a side of said guide arm, the wiring mounting surface is substantially flush with said major planar surface of said load beam, for said wiring pattern and said extension wiring pattern, such that said wiring pattern is mounted along said load beam and said guide arm without bending or twisting deformation of said wiring pattern.

2. The magnetic disk drive according to claim 1, wherein said extension wiring pattern is jointed to said at least one of said wiring mounting surface on said guide arm.

3. A magnetic disk drive according to claim 1, wherein said wiring mounting surface is provided with respect to each opposite major planar side of said guide arm.

4. A magnetic disk drive according to claim 1, wherein said wire mounting surface is provided by a shelf which is thinner in thickness than, and provided along a side of, said guide arm.

5. A magnetic disk drive according to claim 4, wherein a greater part of said wiring pattern along said guide arm is jointed to said shelf.

6. A magnetic disk drive comprising:
   a rotational shaft rotatably supported;
   a magnetic disk medium fixed on said rotational shaft;
   a magnetic head slider facing to said disk medium and mounting a magnetic head for writing/reading information;
   a load beam for supporting at one end thereof said magnetic head slider;
   a guide arm for supporting and fixing the other end of said load beam;
   a second rotational shaft for supporting said guide arm so as to freely swing;
   a voice coil motor for generating a rotational force on said guide arm;
   a fastening member joining said guide arm to said load beam,
      wherein said load beam is provided at said fastening member connected portion thereof with a broad portion which is broader in a width direction of said load beam than said fastening member, and
      a substantially flat wiring pattern, electrically connected to said magnetic head near said magnetic head slider, and which tracks on a major planar surface of said load beam toward said guide arm and is jointed to said broad portion of said load beam, and said wiring pattern includes an extension wiring pattern extended from said broad portion;
      wherein said guide arm includes a wiring mounting surface that is offset in thickness direction of said guide arm and provided on at least one side of said guide arm substantially flush to said major planar surface of said load beam, such that said extension wiring pattern is mounted substantially co-planarly along said load beam and said guide arm without bending or twisting deformation of said wiring pattern.

7. The magnetic disk drive according to claim 6, wherein said broad portion of said load beam is broad enough to allow said wiring pattern to pass through.

8. The magnetic disk drive according to any one of claims 1, 2, 6, and 7, wherein said load beam has an extended portion and said extension wiring pattern is joined to said extended portion of said load beam.

9. A magnetic disk drive according to claim 6, wherein said wiring mounting surface is provided with respect to each opposite major planar side of said guide arm.

10. A magnetic disk drive according to claim 6, wherein said wire mounting surface is provided by a shelf which is thinner in thickness than, and provided along a side of, said guide arm.

11. A magnetic disk drive according to claim 10, wherein a greater part of said wiring pattern along said guide arm is jointed to said shelf.

12. A magnetic disk drive comprising:

a rotational shaft rotatably supported;

a magnetic disk medium fixed on said rotational shaft;

a magnetic head slider facing to said magnetic disk medium and mounting a magnetic head for writing/reading information;

a load beam for supporting at one end thereof said magnetic head slider;

a guide arm for supporting and fixing the other end of said load beam;

a second rotational shaft for supporting said guide arm so as to freely swing;

a voice coil motor for generating a rotational force on said guide arm; and a substantially flat wiring pattern which is electrically connected to said magnetic head near said magnetic head slider, and which tracks on a major planar surface of said load beam toward said guide arm and includes an extension wiring pattern;

wherein said guide arm includes an offset portion on a side of said guide arm, the offset portion is reduced in thickness of said guide arm and providing a wiring mounting surface for said extension wiring pattern, such that said extension wiring pattern is mounted substantially co-planarly along said load beam without bending or twisting deformation of said extension wiring pattern.

13. A magnetic disk drive according to claim 12, further comprising a fastening member for fastening said load beam to said guide arm, wherein said extension wiring pattern is constructed to begin within a range from along said guide arm up until said fastening member.

14. A magnetic disk drive according to claim 12, wherein said load beam is provided with a fastening portion which is broader in a width direction of said load beam than said fastening member.

15. A magnetic disk drive according to claim 12, wherein said wiring pattern is more particularly an integrated wiring structure in which said wiring pattern extends from said magnetic head and along said load beam and said guide arm.

16. A magnetic disk drive according to claim 12, wherein said extension wiring pattern is jointed to said wide arm in substantially all of a range of said guide arm.

17. A magnetic disk drive according to claim 12, wherein said wiring mounting surface is provided with respect to each opposite major planar side of said guide arm.

18. A magnetic disk drive according to claim 12, wherein said offset portion is provided by a shelf which is thinner in thickness than, and provided along a side of, said guide arm.

19. A magnetic disk drive according to claim 18, wherein a greater part of said wiring pattern along said guide arm is jointed to said shelf.

* * * * *